(12) United States Patent
Panikkar et al.

(10) Patent No.: US 10,114,827 B2
(45) Date of Patent: Oct. 30, 2018

(54) SYSTEM AND METHOD FOR AN INTELLIGENT E-MAIL AND CONTENT RESPOSITORY

(71) Applicant: DELL PRODUCTS, LP, Round Rock, TX (US)

(72) Inventors: Shibi Panikkar, Bangalore (IN); Ajit Kar, Berhampur (IN)

(73) Assignee: DELL PRODUCTS, LP, Round Rock, TX (US)

( * ) Notice: Subject to any disclaimer, the term of this patent is extended or adjusted under 35 U.S.C. 154(b) by 292 days.

(21) Appl. No.: 15/051,012

(22) Filed: Feb. 23, 2016

(65) Prior Publication Data
US 2017/0242862 A1    Aug. 24, 2017

(51) Int. Cl.
G06F 17/00    (2006.01)
G06F 17/30    (2006.01)
H04L 12/58    (2006.01)

(52) U.S. Cl.
CPC .... *G06F 17/30076* (2013.01); *G06F 17/3012* (2013.01); *G06F 17/30091* (2013.01); *H04L 51/22* (2013.01)

(58) Field of Classification Search
CPC ............... G06F 3/0482; G06F 3/04842; G06F 3/04883; G06F 17/30867; G06F 21/10; G06F 3/04845
See application file for complete search history.

(56) References Cited

U.S. PATENT DOCUMENTS

| | | | |
|---|---|---|---|
| 7,716,530 B2 | 5/2010 | Verbowski et al. | |
| 8,806,550 B1 | 8/2014 | Chan | |
| 2010/0174784 A1 | 7/2010 | Levey et al. | |
| 2013/0061284 A1* | 3/2013 | Berengoltz | G06F 21/51 726/1 |
| 2014/0280602 A1 | 9/2014 | Quatrano | |

* cited by examiner

*Primary Examiner* — Truong Vo
(74) *Attorney, Agent, or Firm* — Larson Newman, LLP (57) ABSTRACT

An information handling system includes a storage device and a processor that provides a repository. The repository receives a first file, modifies the first file to include first metadata, stores the first file including the first metadata to the storage device, receives a second file, wherein the second file is different from the first file, determines that the second file includes the first metadata, and stores the second file to the storage device in response to determining that the second file includes the first metadata.

16 Claims, 6 Drawing Sheets

SYSTEM AND METHOD FOR AN INTELLIGENT E-MAIL AND CONTENT RESPOSITORY

FIELD OF THE DISCLOSURE

This disclosure generally relates to information handling systems, and more particularly relates to an intelligent e-mail and content repository in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system can include a storage device and a processor that provides a repository. The repository can receive a first file, modify the first file to include first metadata, store the first file including the first metadata to the storage device, receive a second file where the second file can be different from the first file, determine that the second file includes the first metadata, and store the second file to the storage device in response to determining that the second file includes the first metadata.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
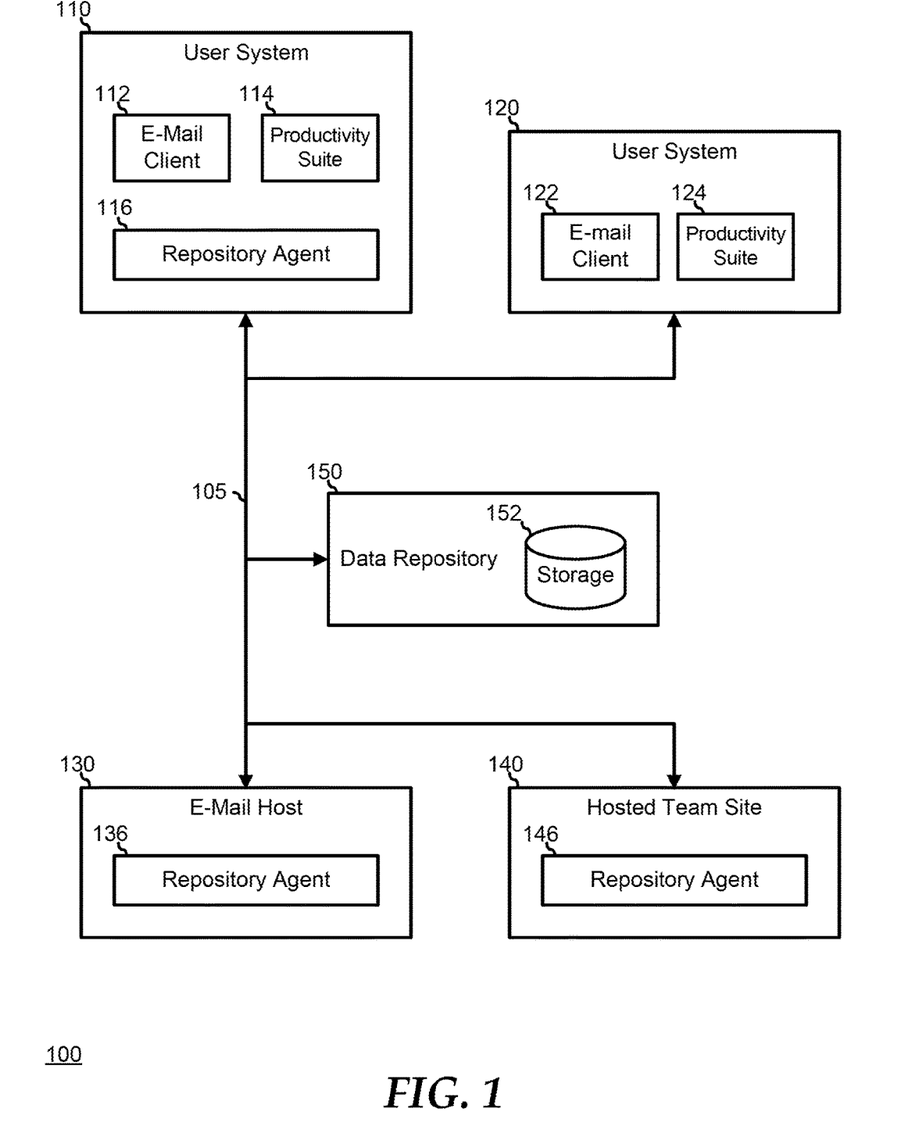
FIG. 1 is a block diagram of a repository system according to an embodiment of the present disclosure.

FIG. 1 illustrates an embodiment of an intelligent e-mail and content repository system 100. Repository system 100 includes a first user's information handling system (user system) 110, one or more additional user's system 120, an e-mail host 130, a hosted team site 140, and a data repository 150. Repository system 100 operates to designate a particular e-mail as the head of a thread of e-mails, to automatically capture and store all subsequent e-mails in the thread of e-mails in data repository 150, to provide for the recall and search of the information included in the thread, and to create a knowledge base from the information. Repository system 100 also operates to designate a particular content item as a top revision of the content item, to automatically capture and store all subsequent revisions of the content item, to provide for the recall and search for the information included in the revisions of the content item, and to create a knowledge base from the information. Further, repository system 100 operates to merge the functions with respect to e-mail threads and to any content items attached to the e-mail threads.

User systems 110 and 120, e-mail host 130, hosted team site 140, and data repository 150 are connected together via a network 105. Network 105 represents a network fabric that operates to permit the passing of information between the connected elements in accordance with a particular network communication standard. In a particular embodiment, network 105 represents the Internet, and one or more of user systems 110 and 120, e-mail host 130, hosted team site 140, and data repository 150 are publicly accessible. Here, security measures, as are known in the art, may be employed to maintain the integrity and confidence of the information communicated in repository system 100, such as Virtual Private Network (VPN) tunneling, data encryption, and the like. In another embodiment, network 105 represents a private intranet. Here, one or more of user systems 110 and 120, e-mail host 130, hosted team site 140, and data repository 150 can also be connected to the Internet or another network, as needed or desired. In another embodiment, network 105 represents a combination of the Internet and a private intranet or other network, as needed or desired.

User system 110 includes an e-mail client 112, a productivity suite 114, and a repository agent 116. User system 120 includes an e-mail client 122 and a productivity suite 124. User systems 110 and 120 operate to provide a respective user or group of users with information handling functionality. As such, user systems 110 and 120 can include personal computers, laptop computers, tablet devices, smart phones, or other information handling systems, as needed or desired. E-mail clients 112 and 122 represent programs for communicating between users of repository system 100 via an e-mail format, such as communications via a Simple Mail Transfer Protocol (SMTP) or another e-mail protocol, as needed or desired. Thus an e-mail, as used herein, represents information that is created, drafted, or written by a first user, identified by a first e-mail address, that is addressed and set to one or more other users, identified by respective e-mail addresses, and that formats the information, the e-mail addresses, and other information into a particular document markup language. For example, an e-mail can be formatted using plain text, using a Rich Text Format (RTF), or another e-mail format, as needed or desired.

Productivity suites 114 and 124 represent programs for the creation and communication of information in various formats, such as database information, spreadsheet information, calendar information, message information, graphical information, presentation information, web content information, multimedia information, or other information as needed or desired. An example of productivity suite 114 and 124 includes an Office productivity suite from Microsoft, an iWork productivity suite from Apple, another productivity suite, or a combination thereof. As such, a content item represents a file of a particular type, as is created, opened, edited, modified, or otherwise manipulated by a particular application of a productivity suite. An example of a content item includes a word processing document, a publishing document, a database or spreadsheet file, a presentation, another type of file or content, or a combination thereof, as needed or desired. E-mail clients 112 and 122, and productivity suites 114 and 124 are presented as examples of information that can be handled by repository system 100, and are not intended as limiting or to preclude other types of information from being handled by the repository system.

E-mail host 130 includes a repository agent 136 similar to repository agent 116, as described further, below. E-mail host 130 represents an e-mail server that operates to provide the e-mail services for users of repository system 100. Hosted team site 140 includes a repository agent 146 similar to repository agent 116, as described further, below. Hosted team site 140 represents a common shared information storage, posting, and retrieval system that has segregated storage in which various groups can collaborate on a common activity. For example, hosted team site 140 can represent a shared workspace, such as a SharePoint team site, a Google Drive storage, a Facebook or other social media page, or another collaborative environment, as needed or desired.

Repository agent 116 operates to enable the user of user system 110 to designate a particular e-mail as the head of a thread of e-mails. Then, when the user selects to send the e-mail to the recipients, repository agent 116 adds agent metadata to the e-mail, as described further, below, and sends the modified e-mail to data repository 150 for further processing. Repository agent 116 also operates to enable the user of user system 110 to designate a particular content item as a top revision of the content item. Then, when the user selects to save the content item, repository agent 116 adds agent metadata to the e-content item, as described further, below, and sends the modified content item to data repository 150 for further processing. An example of a repository agent can include a stand-alone program or application, a plug-in module to one or more of e-mail client 112 and productivity suite 114, a smart phone app or widget, or the like.

Repository agent 116 also enables the user of system 110 to designate a location to save the e-mail or content item. The location can include hosted team site 140, a location on another device, or a file storage location, as needed or desired. In a particular embodiment, hosted team site 140 or the other storage device can be organized in a hierarchical way, as needed or desired. For example, repository agent 116 can provide an option for the user to select to associate the e-mail or content item with a particular project, such as by selecting a the project from a pull-down list of projects. Additionally, each project can be associated with a number of destinations, such as a SharePoint site, a Facebook page, or the like, and the user can be presented with another pull-down list of the associated destinations. Further, each destination can be further associated with a number of folders, such as folders that are associated with various business groups, topics, interests, or the like.

Repository agents 136 and 146 operate similarly to repository agent 116. In particular, where e-mail host 130 or hosted team site 140 are connected to a network other than network 105, such as the Internet or another network, repository agents 136 and 146 operate to enable outside users to designate a particular e-mail or content item and to add agent metadata to the designated items. In this way, the functions and capabilities of repository system 100 can be made available to users inside of an organization that operates the repository system, as well as to users outside of the organization. As such, repository system 100 can employ various data security and user authentication measures as are known in the art, as needed or desired.

Data repository 150 includes a storage device 152. Data repository 150 operates to receive the designated e-mails and content items from repository agents 116, 136, and 146, to add repository metadata to the e-mail or content item, as described further, below, to store the e-mail or content item in storage device 152, to send the re-modified e-mail to e-mail server 130, and to send the re-modified content item to hosted team site 140 or to another storage location, as needed or desired.

When user system 110 receives an e-mail, repository agent 116 determines if the e-mail is part of a thread of e-mails that has been designated for handling by repository system 100. For example, repository agent 116 can search the e-mail to determine if the e-mail includes agent metadata or repository metadata. If the e-mail has not been designated for handling by repository system 100, repository agent 116 can present the user of user system 110 with the option to designate the e-mail as the head of a new thread of e-mails, as described above. Otherwise, if the e-mail is part of a thread that has been designated for handling by repository system 100, repository agent 116 modifies the agent metadata of the e-mail, as described further, below, and sends the modified e-mail to data repository 150. Data repository 150 modifies the repository metadata of the e-mail, as described further, below, stores the re-modified e-mail in storage device 152, and sends the re-modified e-mail back to e-mail client 112 for use by the user of user system 110.

Similarly, when user system 110 receives a content item, repository agent 116 determines if the e-content item is a revision of a content item that has been designated for handling by repository system 100. For example, repository agent 116 can search the content item to determine if the content item includes agent metadata or repository metadata. If the content item has not been designated for handling by repository system 100, repository agent 116 can present the user of user system 110 with the option to designate the content item as a top revision of a new content item, as described above. Otherwise, if the content item is a revision of a content item that has been designated for handling by repository system 100, repository agent 116 modifies the agent metadata of the content item, as described further, below, and sends the modified content item to data repository 150. Data repository 150 modifies the repository metadata of the content item, as described further, below, stores the re-modified content item in storage device 152, and sends the re-modified content item back to productivity suite 114 for use by the user of user system 110.

Repository agents 136 and 146 operate similarly to repository agent 116. In particular, where e-mail host 130 or hosted team site 140 are connected to a network other than network 105, repository agents 136 and 146 operate to determine if the e-mail or content item has been designated for handling by repository system 100. If not, repository agents 136 and 146 can present the sender with the option to designate the e-mail or content item for handling by repository system 100, as described above. Otherwise, repository agents 136 and 146 modify the agent metadata, and send the modified item to data repository 150, where the data repository 150 modifies the repository metadata of the item, and sends the re-modified item to its intended location. In a particular embodiment, where an e-mail or a content item has not been designated for handling by repository system 100, rather than presenting the sender with the option to designate the e-mail or content item for handling by repository system 100, repository agents 136 and 146 can provide a default action to designate the e-mail or content item for handling by the repository system.

User system 120 represents an information handling system that may or may not be a designated portion of repository system 100, but that is characterized by the fact that the user system does not include a repository agent. Here, user system 120 can receive an e-mail or a content item that has been designated for handling by repository system 100. However, because user system 120 does not include a repository agent, changes can be made to the e-mail or content item that are not within the control of repository system 100. As such, an e-mail or content item that permanently leaves repository system 100 will not be tracked and stored by the repository system. However, when such an item returns to repository system 100 via user system 120, the first element of the repository system (that is, user system 100, e-mail host 130, or hosted team site 140) will process the returned item as described above, and the repository system will capture changes made to the e-mail or content item while outside of the repository system. For example, a user of user system 120 can receive an e-mail that includes agent metadata and repository metadata (that is, an e-mail that is designated for handling by repository system 100), and the user can modify the email and forward it to a recipient outside of the repository system, such as by sending via a web based e-mail system. The e-mail can be forwarded and modified multiple times outside of repository system 100 and returned to user system 120. Then, if the user of user system 120 forwards the e-mail to one of user system 110, e-mail host 130, or hosted team site 140, the respective repository agent 112, 132, or 142 will detect the included agent metadata and repository metadata, and handle the e-mail or content item accordingly. Here, the individual modifications to the e-mail or content item that are performed outside of repository system 100 will be lost, but the overall changes will still be captured.

Figure 2:
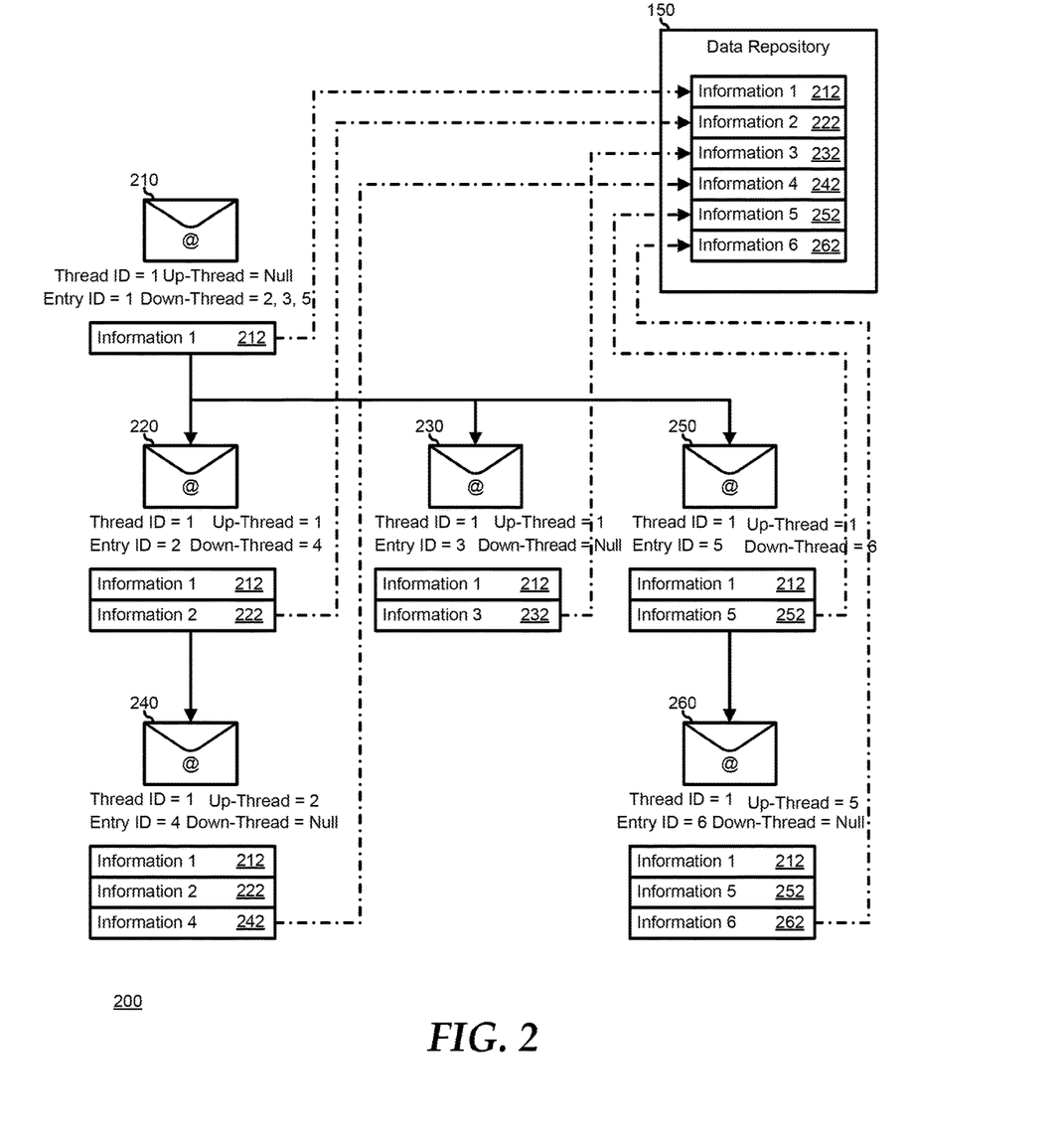
FIG. 2 is a schematic diagram of an example of the capture of an e-mail thread by the repository system of FIG. 1.

FIG. 2 illustrates an example of the capture of an e-mail thread by repository system 100. Here, an e-mail 210 including information 212 is sent to several recipients, and is designated for handling by repository system 100. E-mail 210 is provided with a unique thread identifier (thread ID=1), as being the first thread in repository system 100 and a thread entry identifier (entry ID=1), as being the first entry in the thread. Since e-mail 210 is designated as the head of the thread, the e-mail has no parent e-mail, and so the e-mail includes no link to a parent e-mail (Up-Thread=Null). Further, e-mail 210 initially has no children, and so the e-mail includes no links to child e-mails (Down-Thread=Null). Information 212 is stored in data repository 150 and e-mail 210 is sent to the recipients.

At a later time, e-mail 210 results in reply e-mail 220. Reply e-mail 220 is associated with the unique thread identifier (thread ID=1), as are all other replies that are generated in response to e-mail 210. Reply e-mail 220 is provided with a thread entry identifier (entry ID=2), the second entry in the thread. Further, reply email 220 has a parent e-mail (that is, e-mail 210), and so the e-mail 220 includes a link to the parent e-mail (Up-Thread=1), and the e-mail includes no links to child e-mails (Down-Thread=Null). Reply e-mail 220 includes information 212 and 222. Information 212 and 222 are stored in data repository 150 and reply e-mail 220 is sent to the recipients. Further, because e-mail 210 has spawned a child e-mail, the down-thread indication is modified (Down-Thread=2).

At a next time, e-mail 210 results in reply e-mails 230 and 240. Reply e-mail 230 is provided with a thread entry identifier (entry ID=3), the third entry in the thread, a link to the parent e-mail (Up-Thread=1), and the e-mail includes no links to child e-mails (Down-Thread=Null). Reply e-mail 222 includes information 212 and 232. Information 212 and 232 are stored in data repository 150 and reply e-mail 230 is sent to the recipients. Further, because e-mail 210 has spawned another child e-mail, the down-thread indication is modified (Down-Thread=2, 3).

Still later, reply e-mail 220 results in reply e-mail 240. Reply e-mail 240 is provided with a thread entry identifier (entry ID=3), the third entry in the thread. Further, reply email 240 has a parent e-mail (that is, e-mail 220), and so the e-mail 240 includes a link to the parent e-mail (Up-Thread=2), and the e-mail includes no links to child e-mails (Down-Thread=Null). Reply e-mail 240 includes information 212, 222, and 242. Information 212, 222, and 242 are stored in data repository 150 and reply e-mail 240 is sent to the recipients. Further, because e-mail 220 has spawned a child e-mail, the down-thread indication is modified (Down-Thread=4).

Later, e-mail 210 results in reply e-mail 250. Reply e-mail 250 is provided with a thread entry identifier (entry ID=5), the fifth entry in the thread. Further, reply email 240 includes a link to the parent e-mail (Up-Thread=1), and the e-mail includes no links to child e-mails (Down-Thread=Null). Reply e-mail 225 includes information 212 and 252. Information 212 and 252 are stored in data repository 150 and reply e-mail 250 is sent to the recipients. Further, because e-mail 210 has spawned another child e-mail, the down-thread indication is modified (Down-Thread=2, 3, 5).

Finally, reply e-mail 250 results in reply e-mail 260. Reply e-mail 260 is provided with a thread entry identifier (entry ID=6), the sixth entry in the thread. Further, reply email 260 has a parent e-mail (that is, e-mail 250), and so the e-mail 260 includes a link to the parent e-mail (Up-Thread=5), and the e-mail includes no links to child e-mails (Down-Thread=Null). Reply e-mail 260 includes information 212, 252, and 262. Information 212, 252, and 262 are stored in data repository 150 and reply e-mail 260 is sent to the recipients. Further, because e-mail 250 has spawned a child e-mail, the down-thread indication is modified (Down-Thread=6).

Repository system 100 operates similarly with revisions to content items. In a particular embodiment, rather than storing all of the information associated with an e-mail or content item, repository system 100 only stores differences in successive e-mails or content item revisions. For example, when data repository 150 stores e-mail 220, the repository system can retrieve the information associated with e-mail 210 (information 212), compare the difference between the information associated with e-mail 210 and the information associated with e-mail 220 (information 212 and 222), and only store the differences between the e-mails. In another embodiment, repository system 100 does not actually store the information included in a particular e-mail or content item, instead, the repository system stores links to each e-mail or content item revision. In this way, repository system 100 is not employed as an unnecessary duplicate of the bulk of the information in the e-mail thread or revision history, but merely provides a data structure for retrieving, displaying, searching, and harvesting of a knowledge base from the e-mail thread or revision history, as needed or desired.

Figure 3:
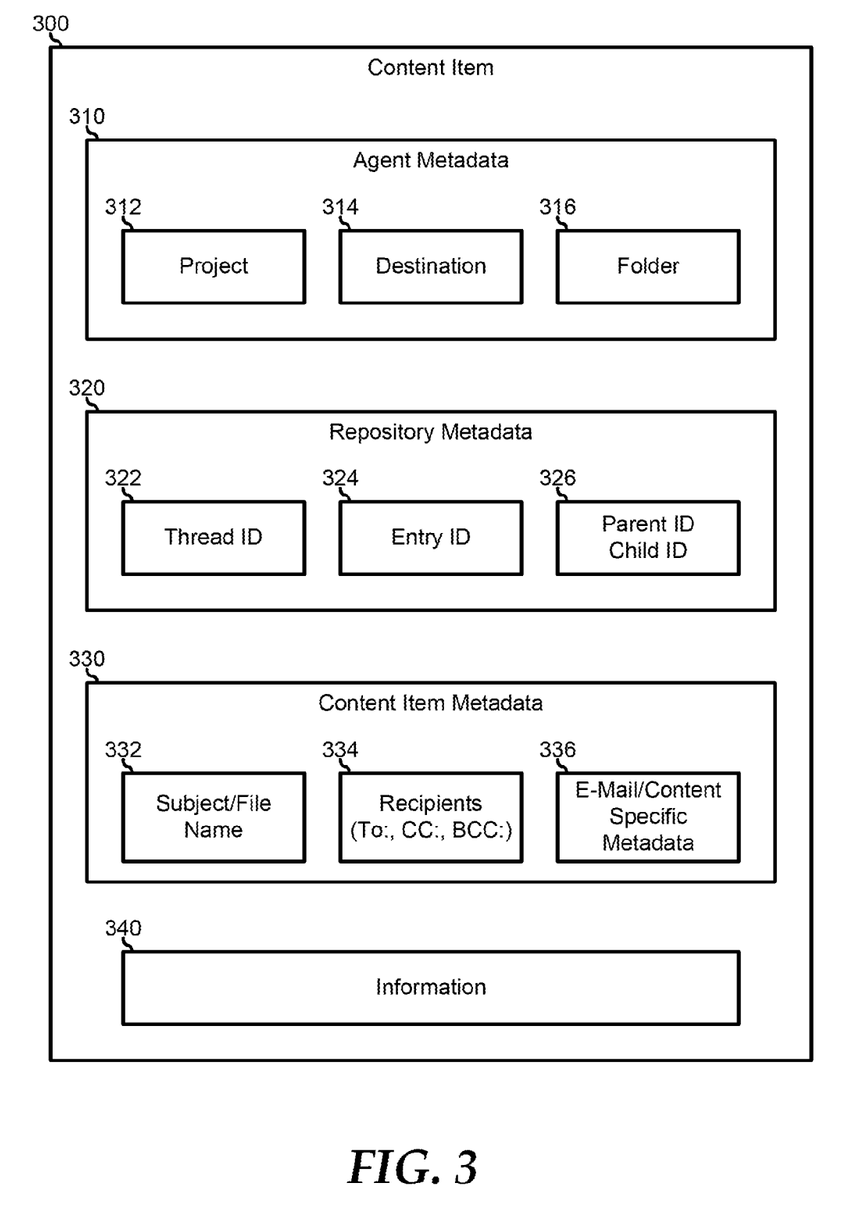
FIG. 3 is a schematic diagram of an example of an e-mail or content item in the data repository of FIG. 1.

FIG. 3 illustrates an embodiment of an e-mail or content item 300 in data repository 150. Item 300 represents the information stored in repository 150 for a particular e-mail or content item, and includes agent metadata 310, repository metadata 320, item metadata 330, and information 340. Agent metadata 310 is added and modified in item 300 by one or more of repository agents 116, 136, and 146, and includes a project identifier 312, a destination location 314, and a folder location 316. Project identifier 312, destination location 314, and folder location 316 are provided by a user when an e-mail or a content item are determined to be handled by repository system 100. For example, repository agent 116 can provide an option for the user of user system 110 to select to associate an e-mail or a content item with a particular project, such as by selecting a the project from a pull-down list of projects. Additionally, the user can be presented with another pull-down list of the associated destinations, and each destination can be further associated with a number of folders, and the user can be presented with a pull-down list of the associated folders.

Repository metadata 320 is added and modified in item 300 by data repository 150, and includes a thread identifier 322, an entry identifier 324, and parent and child identifiers 326. In a particular embodiment, thread identifier 322 is provided as a unique identifier for an e-mail thread or for content item revisions, such as a sequential set of identifiers, each subsequent e-mail thread or content item being given a next in order thread identifier. In another embodiment, thread identifier 322 is provided based upon a subject for an e-mail or a file name for a content item. For example, thread identifier 322 can default to a subject or file name, and then, if another e-mail thread is started with the same subject, data repository 150 can append a unique tag, such as a sequential number, to the subject in order to generate the unique thread identifier.

In a particular embodiment, entry identifier 324 is provided as a unique identifier for an e-mail thread or for content item revisions, such as a sequential set of identifiers, each subsequent e-mail in the thread or content item being given a next in order entry identifier. In another embodiment, entry identifier 324 is provided based upon a subject for an e-mail or a file name for a content item. For example, data repository 150 can append a unique tag, such as a sequential number, to thread identifier 324 in order to generate the unique entry identifier.

Parent and child identifiers 326 include the entry identifiers of the respective preceding and following items in data repository 150. In a particular embodiment, items can be merged from multiple parent threads. Here, parent and child identifiers 326 can include the thread identifier/entry identifier for each parent entry.

Item metadata 330 represents metadata added by one or more of e-mail client 112 or productivity suite 114, and may include proprietary metadata fields, as needed or desired. As illustrated, item metadata 330 includes a subject/file name field 332, a recipients field 334, and items specific metadata field 336. Information 340 represents the data included in item 300. For example, where item 300 represents an e-mail, information 340 can include the e-mail text and any attachments that are included with the e-mail, and where the item represents an office productivity file, such as a spreadsheet, the information can include the spreadsheet information.

Figure 4:
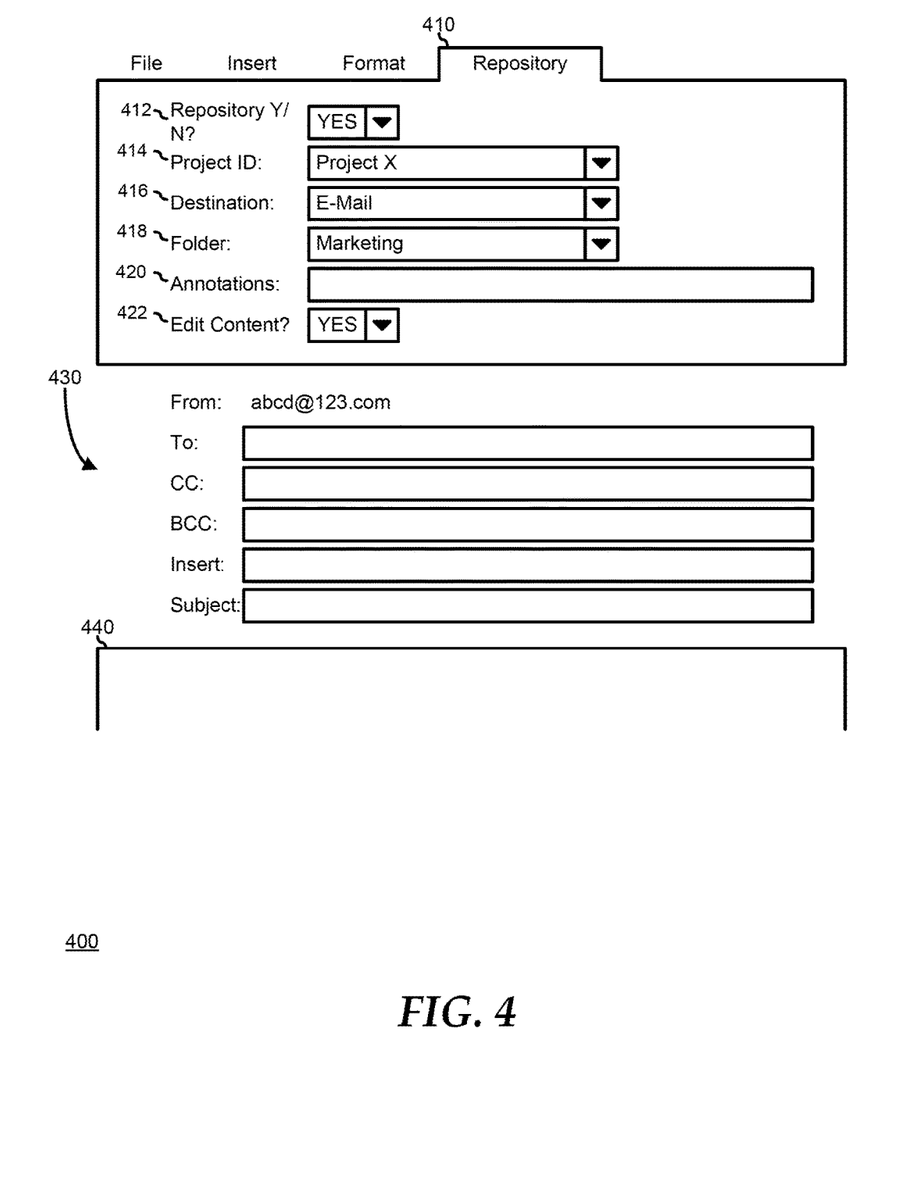
FIG. 4 is a representation of a Graphical User Interface in the repository system of FIG. 1.

FIG. 4 illustrates an embodiment of a Graphical User Interface (GUI) 400 provided by one or more of repository agents 116, 136, or 146 for selecting an e-mail to be handled by repository system 100. GUI 400 includes a repository management tab 410, e-mail management fields 430, and an information entry field 440. Repository management tab 410 includes a repository selector 412, a project identifier field 414, a destination identifier field 416, a folder identifier field 418, an annotations field 420, and a content editor selector 422. Repository selector 412 provides the user with a choice to select that the e-mail be handled by repository system 100 or not. Project identifier field 414, destination identifier field 416, and folder identifier field 418 provide pull-down menus for selecting a project, a destination, and a folder for the e-mail thread to be stored in repository system 100, as described above. Annotations field 420 represents an optional field for a user to enter specific search terms, a brief description of information 440, or other annotations as needed or desired. Content editor selector 422 provides the user with a choice to edit information 440 such that the edited portions of the information are not stored or searched in data repository 150.

Figure 5:
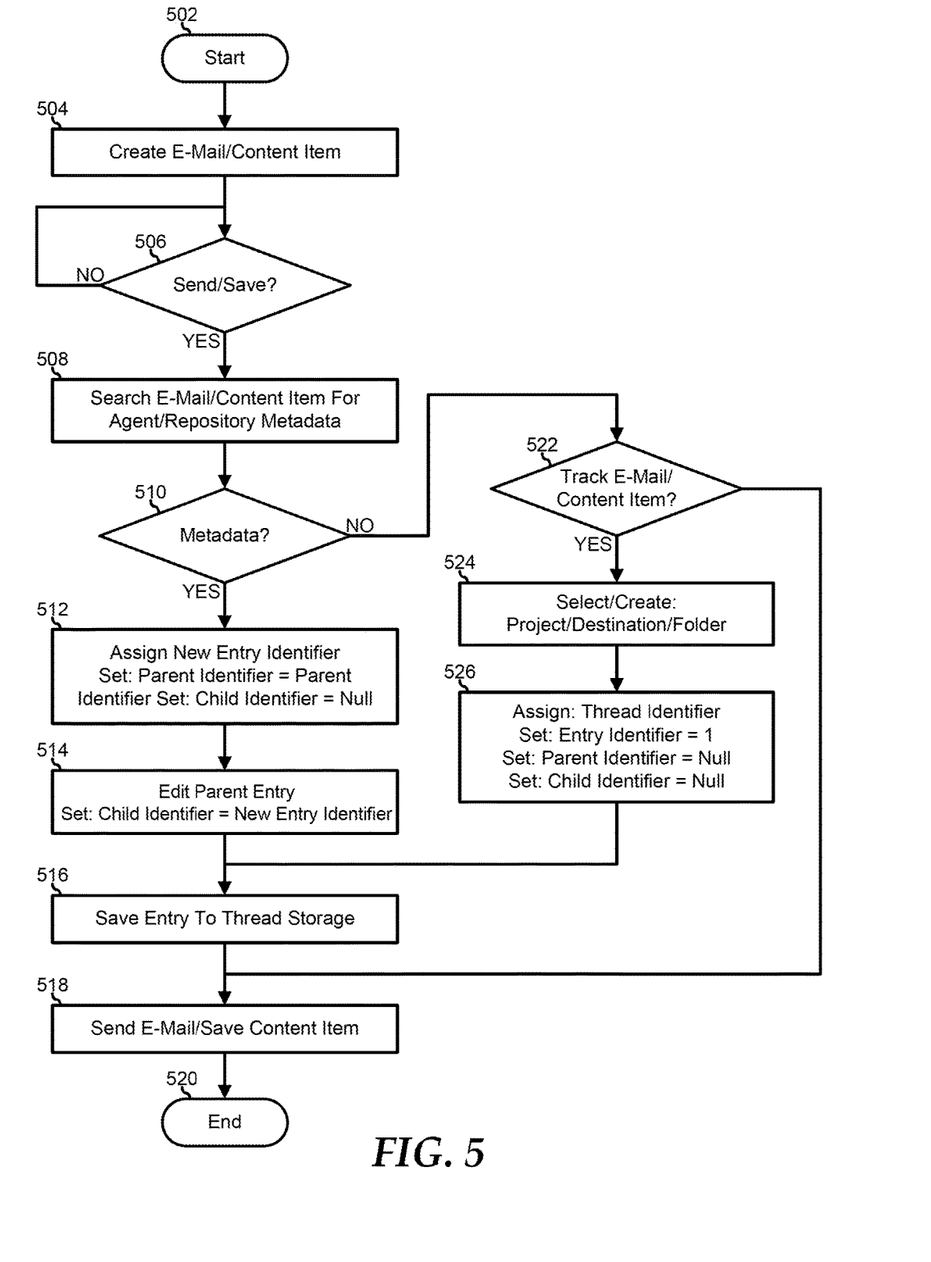
FIG. 5 is a flowchart illustrating a method for providing an intelligent e-mail and content repository according to an embodiment of the present disclosure.

FIG. 5 illustrates a method for providing an intelligent e-mail and content repository, starting at block 502. A user of an information handling system creates an e-mail or content item in block 504. A decision is made as to whether or not the user has decided to send the e-mail or save the content item in decision block 506. If not, "NO" branch of decision block 506 is taken and the method remains at decision block 506 until the user decides to send the e-mail or to save the content item. Then the "YES" branch of decision block 506 is taken, and the e-mail or the content item is searched to determine if the e-mail or the content item includes agent metadata or repository metadata in block 508, in order to determine whether or not the e-mail or content item has been has not been previously designated for handling by the repository system.

A decision is made as to whether or not the e-mail or the content item includes agent metadata or repository metadata in decision block 510. If so, the "YES" branch of decision block 510 is taken and the repository system creates new repository metadata to the e-mail or content item by assigning a new entry identifier, setting the parent identifier to point to the parent e-mail or content item, and setting the child identifier "Null" in block 512. The repository system edits the repository metadata for the parent e-mail or content item by setting the child identifier to point to the new entry identifier for the e-mail or content item in block 514. The entry for the new e-mail or content item is stored in the storage device of the data repository in block 516, the e-mail is sent or the content item is stored in block 518, and the method ends in block 520.

Returning to decision block 510, if the e-mail or the content item does not include agent metadata or repository metadata, the "NO" branch of decision block 510 is taken, and a decision is made as to whether or not the user has designated the e-mail or content item to be handled by the repository system in decision block 522. If not, the "NO" branch of decision block 522 is taken, the e-mail is sent or the content item is stored in block 518, and the method ends in block 520. If the user has designated the e-mail or content item to be handled by the repository system, the "YES" branch of decision block 522 is taken and the user selects or creates a project, a destination, and a folder associated with the e-mail or content item and creates the agent metadata based upon the information in block 524. The repository system creates repository metadata for the e-mail or content item, including assigning a thread identifier for the e-mail or content item, setting the entry identifier to 1, indicating that the e-mail or content item is the first item, and setting the parent identifier and the child identifier to "Null" in block 526. The entry for the new e-mail or content item is stored in the storage device of the data repository in block 516, the e-mail is sent or the content item is stored in block 518, and the method ends in block 520.

Figure 6:
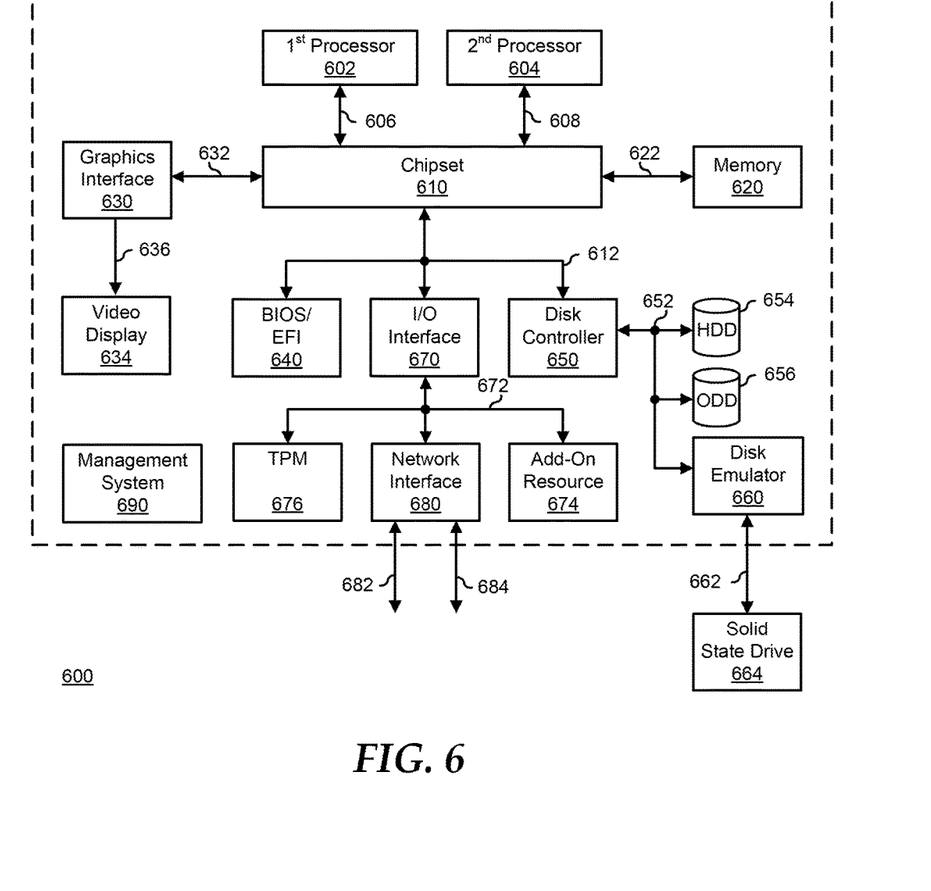
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, a network interface 680, and a management system 690. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674, to a TPM 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management controller 690 provides for out-of-band monitoring, management, and control of the respective elements of information handling system 600, such as cooling fan speed control, power supply management, hot-swap and hot-plug management, firmware management and update management for system BIOS or UEFI, Option ROM, device firmware, and the like, or other system management and control functions as needed or desired. As such, management system 690 provides some or all of the functions and features of the management systems described herein.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a storage device; and
    a repository that:
        receives a first file;
        modifies the first file to include first metadata that indicates that the first file is a first entry of a first thread;
        stores the modified first file including the first metadata to the storage device;
        receives a second file, wherein the second file is different from the first file;
        determines that the second file includes the first metadata; and
        modifies the second file to include second metadata that indicates that the second file is a second entry of the first thread and that the first file is a parent entry to the second file in response to determining that the second file includes the first metadata;
        stores the modified second file including the first metadata and the second metadata to the storage device.

2. The information handling system of claim 1, wherein the repository further:
    receives an indication that the first file is to be stored by the repository, wherein modifying the first file to include the first metadata is in response to the indication.

3. The information handling system of claim 2, wherein the indication includes location information and the location information is included in the first metadata.

4. The information handling system of claim 3, wherein the repository further:
    stores the modified first file at a location indicated by the location information; and
    stores the modified second file at the location.

5. The information handling system of claim 1, wherein in further response to determining that the second file includes the first metadata, the repository:
    retrieves the modified first file from the storage device;
    modifies the modified first file to include third metadata that indicates that the second file is a child entry to the first file; and
    stores the twice modified first file including the first and third metadata to the storage device.

6. The information handling system of claim 1, wherein the first file comprises an e-mail, and the second file comprises a reply to the e-mail.

7. A method comprising:
receiving, at a repository of an information handling system, a first file:
modifying, by the repository, the first file to include first metadata that indicates that the first file is a first entry of a first thread;
storing the modified first file including the first metadata to a storage device of the information handling system;
receiving, at the repository, a second file, wherein the second file is different from the first file;
determining that the second file includes the first metadata;
modifying the second file to include second metadata that indicates that the second file is a second entry of the first thread and that the first file is a parent entry to the second file in response to determining that the second file includes the first metadata; and
storing the modified second file including the first metadata and the second metadata to the storage device.

8. The method of claim 7, further comprising:
receiving an indication that the first file is to be stored by the repository, wherein modifying the first file to include the first metadata is in response to the indication.

9. The method of claim 8, wherein the indication includes location information and the location information is included in the first metadata.

10. The method of claim 9, further comprising:
storing the modified first file at a location indicated by the location information; and
storing the modified second file at the location.

11. The method of claim 7, wherein in further response to determining that the second file includes the first metadata, the method further comprises:
retrieving the modified first file from the storage device;
modifying the modified first file to include third metadata that indicates that the second file is a child entry to the first file; and
storing the twice modified first file including the first and third metadata to the storage device.

12. The method of claim 7, wherein the first file comprises an e-mail, and the second file comprises a reply to the e-mail.

13. A non-transitory computer-readable medium including code for performing a method, the method comprising:
receiving, at a repository of an information handling system, a first file:
modifying the first file to include first metadata that indicates that the first file is a first entry of a first thread;
storing the modified first file including the first metadata to a storage device of the information handling system;
receiving a second file, wherein the second file is different from the first file;
determining that the second file includes the first metadata; and
modifying the second file to include second metadata that indicates that the second file is a second entry of the first thread and that the first file is a parent entry to the second file in response to determining that the second file includes the first metadata; and
storing the modified second file including the first metadata and the second metadata to the storage device.

14. The computer-readable medium of claim 13, the method further comprising:
receiving an indication that the first file is to be stored by the repository, wherein modifying the first file to include the first metadata is in response to the indication.

15. The computer-readable medium of claim 13, wherein in further response to determining that the second file includes the first metadata, the method further comprises:
retrieving the first file from the storage device;
modifying the first file to include second metadata, wherein the second metadata includes a reference to the second file; and
storing the first file including the first and second metadata to the storage device.

16. The computer-readable medium of claim 15, wherein in further response to determining that the second file includes the first metadata, the method further comprises:
modifying the second file to include third metadata, wherein the second metadata includes a reference to the first file; and
storing the second file including the third metadata.

* * * * *